July 11, 1961   P. J. PACKMAN ET AL   2,991,869
APPARATUS FOR HANDLING FLAT ARTICLES
Filed March 25, 1958   3 Sheets-Sheet 1

Inventors:
Percival James Packman and
David Charles Morton
by: Michael S. Striker
Attorney

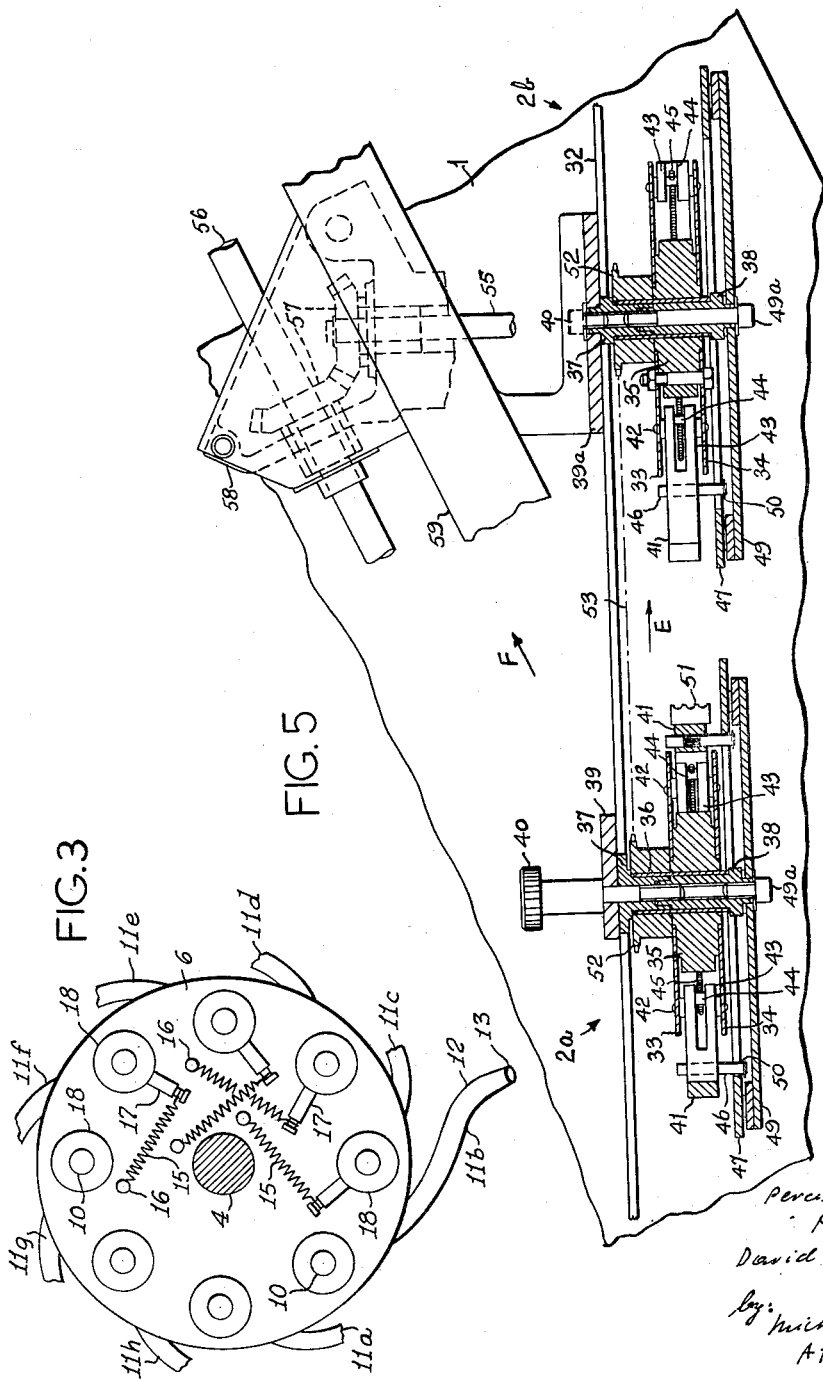

July 11, 1961   P. J. PACKMAN ET AL   2,991,869
APPARATUS FOR HANDLING FLAT ARTICLES
Filed March 25, 1958   3 Sheets-Sheet 3
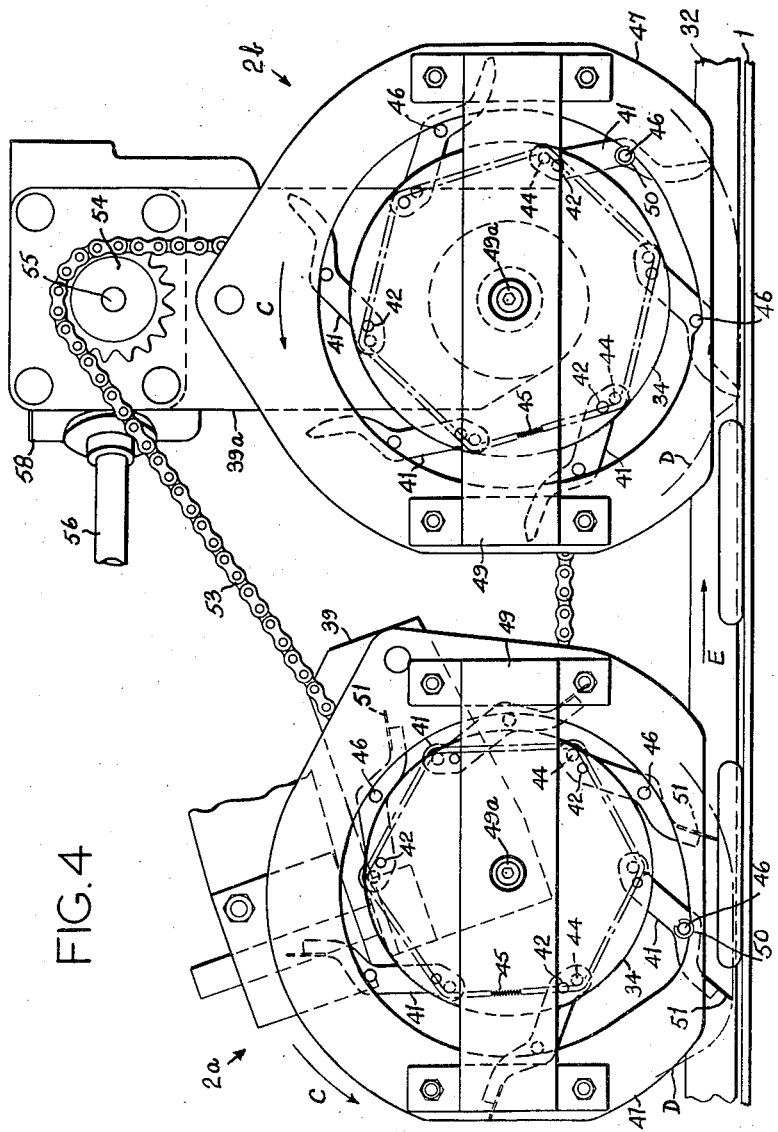

United States Patent Office 2,991,869
Patented July 11, 1961

2,991,869
APPARATUS FOR HANDLING FLAT ARTICLES
Percival James Packman and David Charles Morton, Twyford, England, assignors, by mesne assignments, to Baker Perkins Limited, Westwood Works, England, a British company
Filed Mar. 25, 1958, Ser. No. 723,789
Claims priority, application Great Britain Mar. 27, 1957
15 Claims. (Cl. 198—34)

The present invention relates to apparatus for handling a plurality of substantially identical flat articles, such as biscuits.

In the handling of biscuits employing flat band conveyors on which the biscuits lie in substantially straight rows parallel to their direction of advance, it is often advantageous if the biscuits in each row on a conveyor are spaced at regular intervals. Such a regular spacing of the biscuits frequently facilitates subsequent handling of the biscuits as for example in the handling process described in our copending U.S. patent application Serial No. 524,370, filed July 26, 1955, now Patent No. 2,881,900. In said copending application there is described a simple escapement mechanism which produces an approximately regular spacing of flat articles, particularly biscuits, in a row of such articles lying on a moving conveying surface by completely arresting the movement of at least some of the articles for a short period of time and then releasing them at regularly timed intervals. This escapement mechanism has the disadvantage that the rate at which articles can be fed through it is not very high, usually not more than 125 articles per minute. The reason for this is that if the articles are fed to the escapement mechanism at too high a rate an article which has been stopped by the escapement mechanism cannot accelerate in time, when it is released, to overcome its own inertia and clear the escapement mechanism in the cycle time of the latter.

The object of the present invention is to provide an apparatus for handling a plurality of substantially identical flat articles which overcomes the inertia problem mentioned above.

In accordance with the present invention, apparatus for handling a row of substantially identical flat articles comprises a substantially plane conveying surface adapted to advance the articles of the row in turn past an escapement mechanism arranged adjacent to the conveying surface, said escapement mechanism comprising a plurality of fingers, an end of each finger being adapted to move in the direction of advance of the articles at a speed appreciably slower than the speed of advance of the articles prior to their arrival at the escapement mechanism, said finger ends being adapted to move in succession first towards the conveying surface into the path of the advancing articles and then away from the conveying surface in timed sequence so that each article advanced past the escapement mechanism bears against one of said fingers and has its speed of advance temporarily reduced. Naturally, in order to prevent a build-up of articles at the entry side of the escapement mechanism, the number of fingers moved into the path of the advancing articles in a given time must not be less than the number of articles fed to the escapement mechanism in the same period of time.

Due to the fact that articles are not completely arrested by the escapement mechanism of apparatus according to the invention, they are able to accelerate very rapidly when they are released by the fingers. The apparatus can, therefore, handle articles at a much higher rate than the escapement mechanism described in U.S. patent application Serial No. 524,370 referred to above.

In apparatus according to the invention each article is released by a finger at its leading edge and provided all the articles have the same thickness the spacing apart of the articles in the row as it leaves the escapement mechanism will be regular. By "regular spacing" is meant that the distance from a point on any article in the row to a corresponding point on an adjacent article has the same value, or is a whole multiple of that value, throughout the row.

Two embodiments of apparatus in accordance with the invention will now be described, by way of example, with reference to the accompanying drawings, in which:

FIGURE 3 is a side view of a disc of the embodiment of FIGURE 1;

FIGURE 4 is a side view of another embodiment of the apparatus of the present invention; and FIGURE 5 is a partly sectioned plan view of the embodiment of FIGURE 4.

Figure 1:
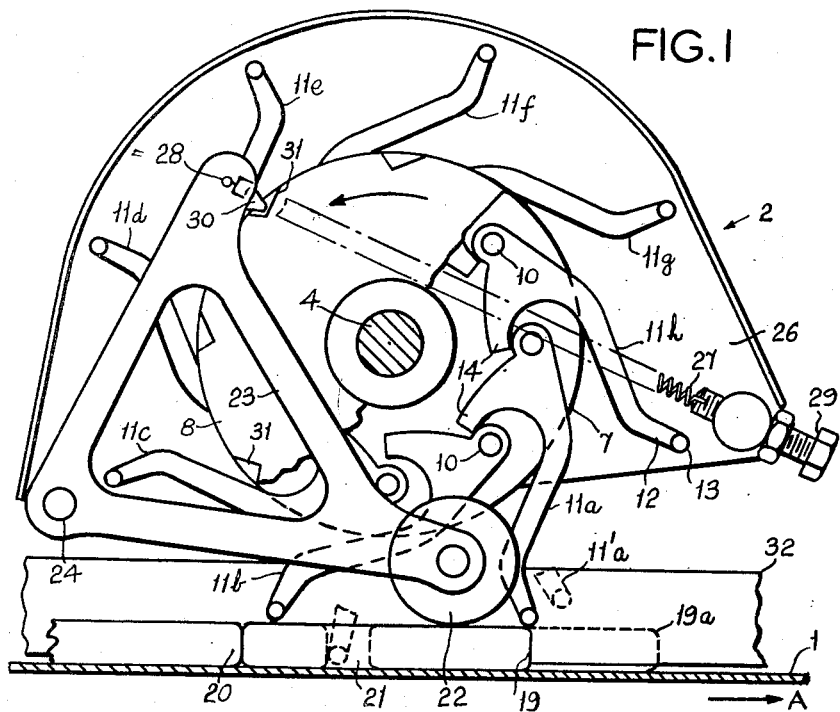
FIGURE 1 is a side view of a first embodiment of the apparatus of the present invention.
Figure 2:
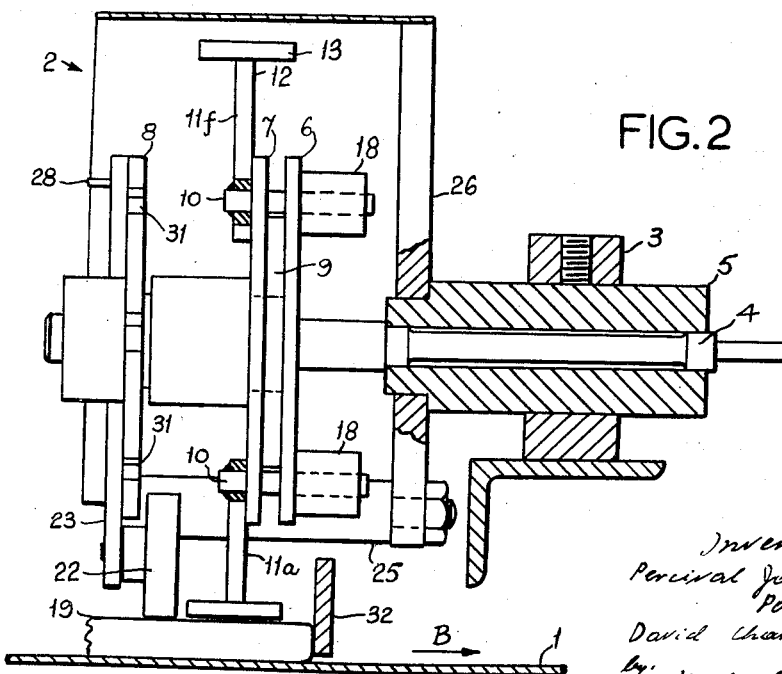
FIGURE 2 is a partly sectioned end view of the embodiment of FIGURE 1 with all the springs omitted.

Referring to FIGURES 1 to 3, the apparatus illustrated comprises a flat conveyor band 1 travelling in a substantially horizontal plane in the direction of the arrow A. The escapement mechanism, generally designated 2, is arranged above the band 1 on a suitable support 3 and comprises a shaft 4 mounted in a sleeve 5 for rotation about a horizontal axis arranged substantially at right angles to the direction of advance of the articles being handled by the conveyor. Three circular discs 6, 7 and 8 are secured to the shaft 4 in parallel spaced relationship, the shaft 4 passing through the disc centers at right angles to the discs. The discs 6 and 7 are separated by a thin spacing plate 9.

Eight shafts 10, to each of which a finger 11 is secured at right angles to the shaft axis, are rotatably mounted in the discs 6, 7. For the sake of convenience, the fingers 11, although they are all identical, have been designated with the numerals 11a . . . 11h. The shafts 10 are spaced at equal intervals around the discs 6, 7 near to the periphery of the latter and are arranged with their axes parallel to and equidistant from the axis of rotation of shaft 4. Each finger 11 comprises a portion 12 which projects beyond the periphery of the discs 6, 7 in a substantially radial direction. A short straight bar 13 is secured to the outer end of each finger portion 12, with the axis of the bar arranged parallel to the axis of rotation of shaft 4. A lug 14 on each finger 11 is urged into contact with the next adjacent finger by means of a light spring 15 (see FIGURE 3). One end of each spring 15 is connected to a peg 16 mounted on the disc 6 and the other end of the spring is connected to a peg 17 mounted on a collar 18 secured to the shaft 10. The pegs 16, 17 and springs 15 associated with four of the fingers 11 only are shown in FIGURE 3, while all the pegs and springs are omitted from FIGURE 2. As a result of the lugs 14 and spring 15 each finger 11 adopts substantially the same angular position relative to a radius of the disc 7 passing through the shaft 10 of the finger, i.e. so that the bars 13 of the fingers lie on an imaginary circle of greater diameter than the discs 6, 7 and are equally spaced around said circle. The length of the fingers 11 is chosen so that the distance between the bars 13 of adjacent fingers is less than the length of the articles to be handled by the apparatus measured in the direction of advance of the articles.

The spacing of the shaft 4 from the conveyor is such that, when a finger 11 has its lug 14 in engagement with the adjacent finger, the bar 13 of the finger just clears the upper surface of the band 1 as the disc 6, 7 rotate, the clearance between the end of the bar 13 and the upper surface of the band 1 being less than the thickness of the articles to be handled. The shaft 4 is rotated at such a speed, and in such a direction, that the bars 13 have a peripheral speed which is appreciably less than the speed of advance of the band in the direction A (for example between 20% and 50% of this speed) and so that when the bars 13 are travelling along the half of their circular path lying nearest to the band 1 they are moving in the same direction as the band 1.

Let it be assumed that the conveyor band 1 moves a row of the articles to be handled towards the escapement mechanism, the articles being arranged in a substantially straight row parallel to the direction of advance of the band and being spaced at irregular intervals in the row. First, let it be assumed that two articles 19 and 20 arrive at the escapement mechanism with the rear edge of the leading article 19 touching the forward edge of the trailing article 20. Let it also be assumed that the forward edge of the leading article 19 travels up to and bears against the bar 13 of the moving finger 11a of the escapement mechanism. Under these conditions the two articles 19, 20 have their speed reduced to that of the peripheral speed of the bar 13 of the finger. In other words the articles slip relative to the band 1.

As the two articles 19, 20 move along at this reduced speed, the next succeeding finger 11b of the escapement mechanism moves down and engages the upper surface of the leading article 19 (since the bars 13 of adjacent fingers 11 are spaced apart by an amount less than the length of the articles 19). The finger 11b yields against the action of its associated spring 15 and applies a small downward force on to the leading article 19.

The two articles 19, 20 continue to move along together at the reduced speed until the free end of the finger 11a, in its movement away from the band 1, rises above the upper surface of the leading article 19. As soon as this happens the two articles 19, 20 are accelerated by the band 1, the leading article 19 sliding under the finger 11b as its speed increases. Due to the slight downward force exerted on the leading article 19 by the finger 11b, however, the friction between the leading article 19 and the band 1 is greater than the friction between the trailing article 20 and the band. Consequently the leading article 19 accelerates more rapidly than the trailing article 20 so that a gap opens up between the two articles. Therefore, by the time the finger 11a has moved to the position 11'a, the leading article 19 has moved from under the finger 11b to the position 19a and a gap 21 has opened up between the two articles 19, 20. The bar 13 of the finger 11b is then moved downwards by its associated spring 15 into the gap 21. The finger 11b then controls the instant of release of the article 20 from the escapement mechanism in exactly the same way as the instant of release of the article 19 was controlled by the finger 11a.

It may be assumed that an article arrives at the escapement mechanism in such a position that its forward edge just passes under a finger 11 before the latter swings down on to the upper surface of the article. In these circumstances, the article continues to move along at substantially the same speed as the band 1 and slides under the finger bearing lightly on its upper surface. Due to the appreciably greater speed of the band 1 as compared with that of the free ends of the fingers 11 the article catches up the next preceding finger and has its speed temporarily reduced by this finger before the latter moves away from the band 1. Even in this case, therefore, the escapement mechanism controls the instant of release of the article.

It will be appreciated that the free ends of the fingers 11 must be able to slide along the upper surfaces of the articles when they bear on these surfaces. The bars 13, therefore, should be smooth. As an alternative to the bars 13, the free ends of the fingers 11 may have small rollers attached to them.

In the apparatus shown in FIGURES 1 to 3, a spring loaded roller 22 is incorporated for the purpose of increasing the friction between the conveyor band 1 and an article as the latter is released by a finger 11 of the escapement mechanism 2. The roller 22 is rotatably mounted adjacent to one corner of a triangular frame 23. The latter is pivotally mounted at 24 on a support 25, which in its turn is secured to a plate 26 mounted on the sleeve 5. The axis of rotation of roller 22 and the pivoting axis of the frame 23 are parallel to the axis of rotation of shaft 4. A tension spring 27 (shown only in FIGURE 1) has one of its ends connected to a peg 28 secured to the third corner of the frame 23 while its other end is anchored to the plate 26 by means of a bolt 29. A projection 30 on the frame 23 engages the peripheral edge of disc 8, in which eight notches 31 are formed. The roller 22 is normally held above the articles on the conveyor band 1 by the projection 30 engaging the edge of the disc 8. When the projection 30 enters a notch 31, however, the spring 27 rotates the frame 23 about its pivot and the roller 22 bears on the upper surface of an article on the band 1 as it is released by a finger 11 of the escapement mechanism. Preferably the roller 22 has a resilient surface so that it does not damage articles of a fragile nature.

In order to make the instant of release of an article by a finger 11 as sharply defined as possible, each finger may be controlled by a suitable control rail (not shown) while its free end is close to the conveyor band 1. This control rail is so shaped that the free end of each finger is caused to move away rapidly from the article at the instant of release of the article.

If desired, the above described apparatus may comprise a straight deflector 32 arranged immediately above the band 1 which has for its purpose to deflect the articles sideways across the band as they are moved along by the latter. In this case the axis of shaft 4 would be arranged substantially at right angles to the longitudinal axis of the deflector instead of at right angles to the direction of advance of the band 1. With this arrangement the band 1 has a component of velocity in the direction of the arrow B (FIGURE 2) which maintains the articles in contact with the deflector 32 as they pass under the escapement mechanism 2. The distance of the fingers 11 from the deflector 32 may be varied by sliding the sleeve 5 in the support 3 so that the apparatus can be adjusted to handle articles of different widths. When the apparatus is arranged in this manner relative to the band 1 the peripheral speed of the bars 13 is arranged to be appreciably less than the speed of advance of the articles in the direction of the deflector 32 (for example, from 20% to 50% of this speed).

The above-described apparatus operates very efficiently provided the articles being handled have a substantially smooth upper surface. If the articles have a rough surface, for example if the articles are biscuits coated with grains of sugar, the free ends of the finger 11 are unable to slide over the articles. In such case, it is preferred to employ the form of apparatus shown in FIGURES 4 and 5.

Referring to FIGURES 4 and 5, the apparatus illustrated comprises two escapement mechanisms, generally designated 2a and 2b. The latter are of similar construction to the escapement mechanism 2 of FIGURES 1 to 3 and are associated with a deflector 32 adapted to deflect articles in the direction of the arrow E across the conveyor band 1 which travels in the direction of the arrow F.

Each escapement mechanism is arranged above the conveyor band 1 in the same way as the escapement mechanism 2 of FIGURES 1 to 3, but the mechanism 2b is arranged downstream of the mechanism 2a, so that the articles being handled pass first under the mechanism 2a and then under the mechanism 2b. To simplify the ensuing description the mechanism 2a will be referred to as the metering mechanism to distinguish it from the escapement mechanism 2b.

The metering mechanism 2a comprises two circular discs 33, 34 separated by a spacing plate 35 which is rotatably mounted on a bushing 36. The bushing 36 is mounted on tubular supporting members 37, 38 which are secured to a frame member 39 by a bolt 40. The axis of bushing 36 is arranged to be horizontal and at right angles to the direction of advance E of the articles. Six identical fingers 41 are pivotally mounted intermediate their ends on shafts 42 which have their ends mounted in the discs 33, 34. The shafts 42 are arranged parallel to and equidistant from the axis of bushing 36 and they are equally spaced around the discs 33, 34. One end of each finger 41 comprises a bifurcated portion 43, the free ends of this bifurcated portion being joined by a peg 44. An endless coil spring 45 passes around the pegs 44 and through the bifurcated portions 43 of all the fingers 41 so as to urge the fingers to rotate in a counterclockwise direction (as viewed in FIGURE 4) around the shafts 42. This counterclockwise rotation of the fingers 41 on the shafts 42 is limited by a pin 46 on each finger engaging a cam plate 47 secured to the tubular supporting member 38 by a plate 49 and bolt 49a. A clip 50 is mounted at the free end of each pin 46. The distance between outwardly directed ends of adjacent fingers 41 is less than the length of the articles to be handled by the apparatus measured in the direction of advance of the articles, preferably not more than 80% of this length.

The fingers 41 differ from the fingers 11 of the apparatus of FIGURES 1 to 3 in that they no longer have smooth and rounded free ends but instead are provided with a chisel-edge 51 at their free ends.

The purpose of the metering mechanism 2a is to engage each article passing under it and to release the articles at regular intervals. To achieve this the discs 33, 34 are rotated in the direction of the arrow C by a sprocket 52 which is in driving engagement with the disc 33, which sprocket is driven by a chain 53. The speed of rotation of the discs 33, 34 is such that the peripheral speed of the chisel-edges 51 of the fingers 41 is appreciably less than the speed of advance of the articles as they approach the mechanism 2a, for example one third the speed. The cam plate 47 is so shaped that as each finger 41 approaches the band 1 the chisel-edge 51 follows the path shown in chain lines and designated by the letter D, provided no articles obstruct the fingers. If an article lies under a finger 41 as the chisel-edge 51 tries to move to the lowest point of path D, then the chisel-edge is urged lightly by the spring 45 into the upper surface of the article. When a row of irregularly spaced articles passes under the metering mechanism 2a, the upper surface of each article will be engaged in this way by one, or possibly two, fingers 41. When the chisel-edge 51 of a finger engages an article it constrains the latter to move at the same speed as the chisel-edge until the latter moves away from the band 1 to release the article. The engaged article does not slip under the finger as in the case of the apparatus described with reference to FIGURES 1 to 3.

Let it be assumed that two articles arrive at the metering mechanism 2a with the rear edge of the leading article touching the forward edge of the trailing article and that a finger engages the leading article approximately midway along its length. The two articles will then have their speed reduced to that of the chisel-edges 51 of the fingers. As the articles move along, the next succeeding finger (hereinafter referred to as the second finger) will engage the trailing article nearer to its forward edge than its rear edge. When the first finger releases the leading article the latter is accelerated by the band 1 away from the trailing article so that a gap is formed between the two articles before the trailing article is released by the second finger. Since the speed differential between the controlled articles and the articles travelling freely in the direction of the arrow E is 1 to 3, the length of the gap formed between the two articles will be nearly two article lengths.

In general, when a row of irregularly spaced articles is fed to the metering mechanism 2a, the articles may be released by the fingers 41 at any point on their surface in their direction of travel. It follows, therefore, that the forward edge of an article, at the instant the article is released, can lie at any point in a zone having a length nearly equal to the length of the articles. Taking into consideration the aforementioned speed differential, a gap of from nearly two to nearly three article lengths (or a whole multiple of this distance) will be produced between successive articles leaving the metering mechanism 2a. In other words, in the row of articles which leaves the metering mechanism the spacing of the articles has a minimum of nearly two article lengths and does not depart from regular spacing (as hereinbefore defined) by more than one article length.

After leaving the metering mechanism 2a, the articles pass under the escapement mechanism 2b. The latter is supported by a frame member 39a and is constructed in substantially the same way as the metering mechanism 2a, and parts common to the two mechanisms have been designated by the same reference numerals. The discs 33, 34 of the escapement mechanism 2b are driven at the same speed as the corresponding discs of the metering mechanism 2a, the sprockets 52 of the two mechanisms being driven from a sprocket 54 by the common chain 53. The escapement mechanism 2b also has six fingers 41, but the distance between the free ends of adjacent fingers 41 is greater than the length of the articles measured in the direction of advance of the articles. The angular position of the discs 33, 34 of the escapement mechanism 2b relative to the same discs of the metering mechanism 2a is adjusted so that the fingers 41 of the escapement mechanism 2b always move into the gap created by the metering mechanism 2a between adjacent articles on the band 1 as they pass to the escapement mechanism 2b. As each article passes under the escapement mechanism 2b, it travels up to a finger 41, which is travelling at one third the speed of the article, has its speed reduced to that of the finger for a short interval of time and is then released by the finger as the latter moves away from the article. The point at which the article meets and is checked by a finger 41 of the escapement mechanism 2b is dependent upon the position of the point of contact on the article, previously, of a chisel-edge 51 of the metering mechanism 2a. Consequently, some articles will travel further than others before being checked, but in no case can an article fail be be checked by a finger of the escapement mechanism 2b. Since the fingers of the escapement mechanism do not have to engage the upper surfaces of the articles being handled (as is the case with the fingers 41 of the metering mechanism 2a) the free ends of the fingers of the escapement mechanism 2b are not provided with chisel-edges 51 as in the case of the metering mechanism 2a.

This second form of apparatus can be adapted to handle articles of different lengths measured in the direction of advance of the articles. Although the same escapement mechanism 2b may be suitable for all sizes of articles it is desired to handle it is usually necessary to provide a range of metering mechanisms 2a and to choose one having a distance between the chisel-edges 51 which is slightly less than the length of the articles to be handled. Exchange of metering mechanisms is effected very simply by removing bolt 40 and replacing the assembly comprising discs 33, 34 and the fingers 41, without disturbing the sprocket 52.

If the articles have a tendency to rebound from the fingers of the escapement mechanism 2b, steps must be taken to prevent this if an absolutely regular spacing of the articles leaving the escapement mechanism is desired. This rebounding of the articles may be stopped very effectively by making the articles pass under a small brush just before they are released by the fingers of the escapement mechanism. The brush is so arranged that its bristles are inclined downwardly towards the conveying surface in the direction of advance of the articles and with the free ends of the bristles lying in the path of the articles. The bristles yield to allow the passage of an article thereunder, but if the article tries to rebound from a finger the bristles act as a ratchet and prevent rearward movement of the article. To prevent articles climbing on top of one another when touching end to end as they pass under the metering mechanism 2a, the lower edge of the cam plate 47 is arranged at a height above the band 1 which is greater than the thickness of the articles being handled, but less than twice this thickness. The lower edge of the cam plate 47 also serves to prevent tilting of the articles if they are checked by the chisel-edges 51 at their forward edges when passing under the metering mechanism.

In the apparatus of FIGURES 4 and 5, the shaft 55 of sprocket wheel 54 is driven from a shaft 56 by means of bevel gears 57 housed in a gear housing 58. The shaft 56 may be arranged to drive a series of apparatus of the kind shown in FIGURES 4 and 5 which are disposed at intervals along the band 1, each apparatus being adapted to handle a row of articles on the band. The supports 39 and 39a and the gear housings 58 of the various apparatus may be secured to a common supporting member 59 (FIGURE 5).

The invention is not of course limited to the two particular forms of apparatus described in detail above. For example, the fingers need not be mounted on discs but may be mounted instead on a suitable rotatable framework. Again, the conveying surface need not travel in a horizontal plane but may be inclined either in the direction of travel of the surface or transversely thereto.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Apparatus for handling a row of substantially identical flat articles comprising a substantially plane conveying surface adapted to advance the articles of the row in turn past a metering mechanism and then past an escapement mechanism both of said mechanisms being arranged adjacent to the conveying surface, said metering mechanism comprising means for engaging each article and constraining it to move at a reduced speed before releasing it, so that the articles leaving the metering mechanism are spaced apart in the direction of travel of the articles, and said escapement mechanism comprising a plurality of fingers, means for moving an end of each finger in the direction of advance of the articles at a speed appreciably slower than the speed of advance of the articles on arrival at the escapement mechanism, and means for moving said finger ends in succession first towards the conveying surface into the spaces between the advancing articles and then away from the conveying surface in timed sequence so that each article advanced past the escapement mechanism bears against one of said fingers and has its speed of advance temporarily reduced whereby the articles leaving said escapement mechanism have regular spacing.

2. Apparatus as claimed in claim 1, in which said fingers are pivotally mounted on a rotatable disc or framework, each finger turnable about a separate axis, the axis of rotation of the disc or framework being substantially parallel to the conveying surface and substantially at right angles to the direction of advance of the articles, and the pivoting axes of the said fingers being parallel to and equidistant from the axis of rotation of the disc or framework and spaced at equal intervals around said disc or framework.

3. Apparatus as claimed in claim 2, in which each finger is urged by spring means against a stop into a position in which said finger ends project outwardly from the disc or framework.

4. Apparatus as claimed in claim 3, in which a cam plate acts as common stop for all the fingers.

5. Apparatus as claimed in claim 3, in which the distance between adjacent finger ends when the fingers are urged against said stop is greater than the length of the articles being handled measured in the direction of their advance on the conveying surface.

6. Apparatus as claimed in claim 1, in which the metering and escapement mechanisms are synchronised with one another so that as the finger ends of the escapement mechanism are brought into the path of the articles they move into the gaps between the articles created by the metering mechanism.

7. Apparatus for handling a row of substantially identical articles comprising, in combination, means for advancing said articles at a predetermined speed and in a predetermined direction along a plane, said articles having susbtantially equal predetermined lengths measured in said predetermined direction; metering means located adjacent said plane for temporarily engaging each of the articles as it is moved along said plane past said metering means and for constraining each of said articles to move while being engaged at a speed smaller than the predetermined speed so that the articles leaving said metering means are spaced apart in the direction of travel; and escaping means located adjacent said plane and including a plurality of fingers having respectively free ends movable toward said plane in the path of said articles and away therefrom and movable in the direction of travel of said articles, the free ends of adjacent ones of said fingers being spaced from each other a distance greater than the length of said articles, and means for moving said fingers for engaging each of said spaced articles at the leading edge thereof and for releasing the same in timed sequence so that the articles leaving said escaping means are spaced from each other with regular spacing.

8. Apparatus for handling a row of substantially identical flat articles comprising, in combination, means for advancing said articles at a predetermined speed and in a predetermined direction along a plane; metering means located adjacent said plane for temporarily engaging each of the articles at the flat top surface thereof as it is moved along said plane past said metering means and for constraining each of said articles to move while being engaged at a speed smaller than the predetermined speed so that the articles leaving said metering means are spaced apart in the direction of travel; and escaping means located adjacent said plane and including a plurality of fingers having respectively free ends movable toward said plane in the path of said articles and away therefrom and movable in the direction of travel of said articles, and means for moving said fingers toward and away from said plane in timed sequence into the spaces between said articles and for moving said fingers in the direction of travel of said articles with a speed smaller than said predetermined speed so that the leading edge of each of the articles is engaged by one of said fingers, whereby said articles will leave said escaping means spaced from each other with regular spacing.

9. Apparatus for handling a row of substantially identical flat articles comprising, in combination, means for advancing said articles at a predetermined speed and in a predetermined direction along a plane; metering means located adjacent said plane for temporarily engaging each of the articles at the flat top surface thereof as it is moved along said plane past said metering means and for constraining each of said articles to move while being engaged at a speed smaller than the predetermined speed so that the articles leaving said metering means are spaced apart in the direction of travel; and escaping means located adjacent said plane and downstream of said metering means and including a plurality of fingers having respectively free ends movable toward said plane in the path of said articles and away therefrom and movable in the direction of travel of said articles, and means for moving said fingers toward and away from said plane in timed sequence into the spaces between said articles and for moving said fingers in the direction of travel of said articles with a speed smaller than said predetermined speed so that the leading edge of each of the articles is engaged by one of said fingers, whereby said articles will leave said escaping means spaced from each other with regular spacing.

10. Apparatus for handling a row of substantially identical flat articles comprising, in combination, means for advancing said articles at a predetermined speed and in a predetermined direction along a plane; metering means located adjacent said plane for temporarily engaging each of the articles at the flat top surface thereof as it is moved along said plane past said metering means and for constraining each of said articles to move while being engaged at a speed smaller than the predetermined speed so that the articles leaving said metering means are spaced apart in the direction of travel, said metering means including a plurality of engaging fingers having each a free end movable towards said plane into engagement with the top surface of the articles and away therefrom, and means for moving said free ends of said fingers in timed sequence into engagement with said top surfaces and away therefrom so that each of said articles advanced past the metering means is temporarily engaged by one of said engaging fingers; and escaping means located adjacent said plane and downstream of said metering means and including a plurality of fingers having respectively free ends movable toward said plane in the path of said articles and away therefrom and movable in the direction of travel of said articles, and means for moving said fingers toward and away from said plane in timed sequence into the spaces between said articles and for moving said fingers in the direction of travel of said articles with a speed smaller than said predetermined speed so that the leading edge of each of the articles is engaged by one of said fingers, whereby said articles will leave said escaping means spaced from each other with regular spacing.

11. Apparatus for handling a row of substantially identical flat articles comprising, in combination, means for advancing said articles at a predetermined speed and in a predetermined direction along a plane; metering means located adjacent said plane for temporarily engaging each of the articles at the flat top surface thereof as it is moved along said plane past said metering means and for constraining each of said articles to move while being engaged at a speed smaller than the predetermined speed so that the articles leaving said metering means are spaced apart in the direction of travel, said metering means including support means turnable about an axis substantially parallel to said plane and substantially normal to said predetermined direction, a plurality of engaging fingers mounted on said support means each turnable about an axis parallel to said axis of said support means, said pivoting axes of said engaging fingers being located along a circle concentric with said axis of said support means and being equally spaced from each other, and means for turning said support means about its axis so that the free ends of said engaging fingers move past said plane with a speed smaller than said predetermined speed; and escaping means located adjacent said plane and downstream of said metering means and including a plurality of fingers having respectively free ends movable toward said plane in the path of said articles and away therefrom and movable in the direction of travel of said articles, and means for moving said fingers toward and away from said plane in timed sequence into the spaces between said articles and for moving said fingers in the direction of travel of said articles with a speed smaller than said predetermined speed so that the leading edge of each of the articles is engaged by one of said fingers, whereby said articles will leave said escaping means spaced from each other with regular spacing.

12. Apparatus for handling a row of substantially identical flat articles comprising, in combination, means for advancing said articles at a predetermined speed and in a predetermined direction along a plane; metering means located adjacent said plane for temporarily engaging each of the articles at the flat top surface thereof as it is moved along said plane past said metering means and for constraining each of said articles to move while being engaged at a speed smaller than the predetermined speed so that the articles leaving said metering means are spaced apart in the direction of travel, said metering means including support means turnable about an axis substantially parallel to said plane and substantially normal to said predetermined direction, a plurality of engaging fingers mounted on said support means each turnable about an axis parallel to said axis of said support means, said pivoting axes of said engaging fingers being located along a circle concentric with said axis of said support means and being equally spaced from each other, spring means operatively connected to said engaging fingers for resiliently urging the free ends thereof toward said plane into engagement with the top surface of said articles as the same are advanced past said metering means, the distance between the free ends of said fingers being smaller than the length of said articles, stationary guide means cooperating with said fingers to control the path of the free ends thereof during movement thereof adjacent said plane, and means for turning said support means about its axis so that the free ends of said engaging fingers move past said plane with a speed smaller than said predetermined speed; and escaping means located adjacent said plane and downstream of said metering means and including a plurality of fingers having respectively free ends movable toward said plane in the path of said articles and away therefrom and movable in the direction of travel of said articles, and means for moving said fingers toward and away from said plane in timed sequence into the spaces between said articles and for moving said fingers in the direction of travel of said articles with a speed smaller than said predetermined speed so that the leading edge of each of the articles is engaged by one of said fingers, whereby said articles will leave said escaping means spaced from each other with regular spacing.

13. Apparatus as defined in claim 10, in which the free ends of said engaging fingers are sharp.

14. Apparatus for handling a row of substantially identical articles comprising, in combination, means for advancing said articles at a predetermined speed and in a predetermined direction along a plane, said articles having substantially equal predetermined lengths measured in said predetermined direction; metering means located adjacent said plane for temporarily engaging each of the articles as it is moved along said plane past said metering means and for constraining each of said articles to move while being engaged at a speed smaller than the predetermined speed so that the articles leaving said metering means are spaced apart in the direction of travel; escaping means located adjacent said plane and including a plurality of fingers having respectively free ends movable toward said plane in the path of said articles and away therefrom and movable in the direction of travel of said articles, the free ends of adjacent ones of said fingers being spaced from each other a distance greater than the length of said articles, and means for moving said fingers for engaging each of said spaced articles at the leading edge thereof and for releasing the same in timed sequence so that the articles leaving said escaping means are spaced from each other with regular spacing;

and means for synchronizing the movement of said metering means and escaping means.

15. Apparatus for handling a row of substantially identical articles comprising, in combination, means for advancing said articles at a predetermined speed and in a predetermined direction along a plane, said articles having substantially equal lengths measured in said predetermined direction; metering means located adjacent said plane for temporarily engaging each of the articles as it is moved along said plane past said metering means and for constraining each of said articles to move while being engaged at a speed smaller than the predetermined speed so that the articles leaving said metering means are spaced apart in the direction of travel a distance equal to at least substantially two article lengths; and escaping means located adjacent said plane and including a plurality of fingers having respectively free ends movable toward said plane in the path of said articles and away therefrom and movable in the direction of travel of said articles, the free ends of adjacent ones of said fingers being spaced from each other a distance greater than the length of said articles, and means for moving said fingers for engaging each of said spaced articles at the leading edge thereof and for releasing the same in timed sequence so that the articles leaving said escaping means are spaced from each other with regular spacing.

References Cited in the file of this patent
UNITED STATES PATENTS

| | | |
|---|---|---|
| 2,279,573 | Lang | Apr. 14, 1942 |
| 2,304,905 | Gantzer | Dec. 15, 1942 |
| 2,383,270 | Niederer | Aug. 21, 1945 |
| 2,781,122 | Gueffroy | Feb. 12, 1957 |